United States Patent
Bennett et al.

(10) Patent No.: US 11,686,246 B2
(45) Date of Patent: Jun. 27, 2023

(54) PROPULSION SYSTEM FOR AN AIRCRAFT

(71) Applicant: Gulfstream Aerospace Corporation, Savannah, GA (US)

(72) Inventors: Shawn Bennett, Savannah, GA (US); Joe Gavin, Savannah, GA (US); Nicholas Powell, Savannah, GA (US); Donald Freund, Savannah, GA (US); Derek Muzychka, Savannah, GA (US); John Louis, Savannah, GA (US)

(73) Assignee: Gulfstream Aerospace Corporation

( * ) Notice: Subject to any disclaimer, the term of this patent is extended or adjusted under 35 U.S.C. 154(b) by 0 days.

(21) Appl. No.: 17/451,137

(22) Filed: Oct. 15, 2021

(65) Prior Publication Data
US 2023/0120249 A1  Apr. 20, 2023

(51) Int. Cl.
*F02C 7/042* (2006.01)
*F02C 7/057* (2006.01)
*F02K 1/16* (2006.01)
*B64D 33/02* (2006.01)

(52) U.S. Cl.
CPC ............ *F02C 7/042* (2013.01); *F02C 7/057* (2013.01); *F02K 1/165* (2013.01); *B64D 2033/0206* (2013.01); *B64D 2033/026* (2013.01); *B64D 2033/0226* (2013.01); *F05D 2220/323* (2013.01); *F05D 2270/122* (2013.01)

(58) Field of Classification Search
CPC .. F02C 7/042; F02C 7/057; B64D 2033/0206; B64D 2033/0226; B64D 2033/026; F02K 7/14; F02K 7/165; F02K 7/06; F02K 7/12
See application file for complete search history.

(56) References Cited

U.S. PATENT DOCUMENTS

| | | | |
|---|---|---|---|
| 3,058,693 A | 10/1962 | Doak | |
| 3,295,555 A | 1/1967 | James et al. | |
| 5,014,933 A * | 5/1991 | Harm | B64D 33/02 181/220 |
| 2010/0070112 A1 | 3/2010 | Couey et al. | |
| 2013/0263601 A1* | 10/2013 | Richardson | F02C 7/047 60/722 |
| 2018/0057184 A1* | 3/2018 | Jackowski | B64D 43/00 |
| 2018/0283276 A1 | 10/2018 | Todorovic | |
| 2020/0088097 A1* | 3/2020 | Bouldin | B64D 33/02 |
| 2020/0131997 A1* | 4/2020 | Hanlon | F02K 3/075 |
| 2020/0386158 A1* | 12/2020 | Lacko | B64D 33/02 |

* cited by examiner

*Primary Examiner* — Andrew H Nguyen
(74) *Attorney, Agent, or Firm* — LKGlobal | Lorenz & Kopf, LLP

(57) ABSTRACT

An aircraft propulsion system includes an engine. The propulsion system further includes an inlet having a forward cowl lip and an aft cowl lip. The forward cowl lip moves between retracted and deployed positions. The forward cowl lip is adjacent to the aft cowl lip when retracted. The forward cowl lip is spaced apart from the aft cowl lip when deployed. The forward cowl lip has a smaller radius of curvature than the aft cowl lip. The propulsion system further includes a controller coupled with the engine and inlet. The controller restricts the maximum thrust commanded position of the engine when the aircraft is on the ground and moving below a predetermined speed. The controller lifts the restriction when the aircraft is moving at at least the predetermined speed. The controller controls the inlet to deploy the cowl lip when the aircraft is on the ground.

18 Claims, 6 Drawing Sheets

PROPULSION SYSTEM FOR AN AIRCRAFT

TECHNICAL FIELD

The present invention relates generally to an aircraft, and more particularly relates to a propulsion system for an aircraft.

BACKGROUND

Propulsion systems for supersonic aircraft are called upon to deliver thrust throughout a wide range of velocities. The propulsion system will need supply thrust in an amount that is sufficient to overcome inertia and start the supersonic aircraft moving from a static state (i.e., standing still) while the aircraft is on the ground. The propulsion system will then need to keep the aircraft moving along the ground during a taxi phase and then accelerate the aircraft to a speed that is sufficient to support flight during take-off. Ultimately, the propulsion system will need to deliver thrust in an amount that is sufficient to achieve and sustain flight at speeds equal to, and greater than, the local speed of sound.

The need to supply thrust throughout this range of velocities presents a unique challenge for a propulsion system, and in particular, a unique challenge for the inlet of the propulsion system. At low speeds, an inlet having a wide cowl lip with a relatively large radius of curvature is desirable. When an aircraft is in a static state and the propulsion system's engine is powered up, the propulsion system will draw in air not only from regions located directly in front of the inlet, but also from regions located to the side of the inlet and even from regions located to the rear of the inlet. Air entering the inlet from the side and the rear of the inlet must make a very sharp turn around the inlet's cowl lip in order to remain attached to the surface of the inlet. These turns may range from between approximately ninety degrees to as much as approximately one hundred and eighty degrees. The flow entering the inlet is of low momentum due to the static condition, and the attachment point is downstream of the inlet lip due to high power setting required. This results in flow that is prone to separation, building up a boundary layer over a longer distance, and then moving over a sharp change in curvature around the inlet lip. That sharp curvature introduces a large pressure gradient which is likely to separate the low momentum flow.

Inlet flow distortion close to the fan face is undesirable because it generates variations in local airflow velocity and pressure near the engine's fan face. These variations translate into varying angles of attack, and load on the fan blade. Similar to a wing, variations in angle of attack lead directly to a variation in load. Primary concern is, if the angle of attack exceeds some maximum achievable load on the fan blade, the fan blade will stall. If the stall persists across a large enough portion of the fan, the required pressure rise across the fan section cannot be achieved, and the compressor will surge. A surge represents a rapid flow reversal through the compressor which can cause damage to the turbomachinery due to the turbomachinery being in the presence of pressures and temperatures they were not designed to operate in. Other effects of the velocity and pressure change can lead to fan imbalance which can cause flutter, excessive vibrations, and additional noise sources from the separated flow interacting with turbo machinery.

Flow distortion can be reduced, minimized, or even eliminated if the cowl lip is sufficiently blunt. In other words, the larger the cowl lip's radius of curvature is, the lower the pressure gradient, and the lower the likelihood of separation. Accordingly, when the propulsion system's engine thrust is increased to start the aircraft moving from a standstill, it is desirable to manage the suction peak of the flow moving around the lip by reducing the engine demand and providing a larger lip with a smoother pressure gradient.

At speeds equal to, or greater than the local speed of sound, however, an inlet having a large, blunt cowl lip is highly undesirable. The amount and magnitude of shocks that a large blunt cowl lip would generate would be unacceptably high. The shocks would interact with the boundary layer formed over the aircraft's various surfaces causing flow separation which would entail undesirable consequences. In addition, the drag caused by a large blunt cowl lip moving through the air at, or above, sonic speeds would have an adverse and undesirable impact on the aircraft's specific range.

At speeds equal to, or greater than the local speed of sound, however, an inlet having a large, blunt leading edge is highly undesirable. This blunt leading edge, when presented with local supersonic airflow generates a strong shock wave across exposed portions of the aircraft. The positive pressure of the shock wave disrupts the negative pressure associated with a lift field. The interaction between this shock wave and the surrounding aircraft can generate separation of the boundary layer. In the case of a wing interaction the result could be the onset of perceptible buffet. With respect to the fuselage, if the inlet is sufficiently close to this separated boundary layer, the result could be ingestion of the low momentum fluid from the boundary layer leading to a deficiency in pressure recovery resulting from this ingestion.

For these reasons, when the aircraft is in flight and flying at speeds equal to or greater than the local speed of sound, it is desirable for the inlet to have a relatively thin cowl lip with a relatively small radius of curvature. This would present as small a cross sectional surface area as possible to an oncoming sonic or supersonic freestream and, consequently, it would minimize the amount and magnitude of the shocks formed by the inlet. Similarly, it would minimize the drag imparted by the inlet. However, such a configuration would increase the likelihood, magnitude, and extent of flow separation when the intake flow demand is increased while the aircraft is in a static state or when the aircraft is moving at a slow speed on the ground. From the foregoing, we see that the two solutions are in tension with one another. Each solution would mitigate one problem but exacerbate the other.

Accordingly, it is desirable to provide a propulsion system that addresses the concerns expressed above. Furthermore, other desirable features and characteristics will become apparent from the subsequent summary and detailed description and the appended claims, taken in conjunction with the accompanying drawings and the foregoing technical field and background.

BRIEF SUMMARY

A propulsion system for use with an aircraft is disclosed herein.

In a first non-limiting embodiment, the propulsion system includes, but is not limited to, an engine having a predetermined tolerance for flow distortion. The propulsion system further includes, but is not limited to, an inlet disposed upstream of the engine. The inlet includes a forward cowl lip and an aft cowl lip. The forward cowl lip is disposed forward of the aft cowl lip. The forward cowl lip is configured to move between a retracted position and a deployed position.

The forward cowl lip is adjacent to the aft cowl lip in a sealed arrangement such that a freestream of air is precluded from passing between the forward cowl lip and the aft cowl lip when the forward cowl lip is in the retracted position. The forward cowl lip is spaced apart from the aft cowl lip when the forward cowl lip is in the deployed position. The forward cowl lip has a first radius of curvature. The aft cowl lip has a second radius of curvature. The first radius of curvature is less than, or equal to, the second radius of curvature. The propulsion system still further includes, but is not limited to, a controller that is operatively coupled with the engine and with the inlet. The controller is configured to impose a restriction on a maximum thrust commanded position of the engine when the aircraft is on a ground surface and moving below a predetermined speed. The controller is further configured to lift the restriction when the aircraft is moving at at least the predetermined speed. The controller is still further configured to control the forward cowl lip to move between the retracted position and the deployed position based on a phase of flight of the aircraft.

In another non-limiting embodiment, the propulsion system includes, but is not limited to, an engine having a predetermined tolerance for flow distortion. The propulsion system further includes, but is not limited to, an inlet disposed upstream of the engine. The inlet includes a forward cowl lip and an aft cowl lip. The forward cowl lip is disposed forward of the aft cowl lip. The forward cowl lip is configured to move between a retracted position and a deployed position. The forward cowl lip is adjacent to the aft cowl lip in a sealed arrangement such that a freestream of air is precluded from passing between the forward cowl lip and the aft cowl lip when the forward cowl lip is in the retracted position. The forward cowl lip is spaced apart from the aft cowl lip such that the freestream of air can flow between the forward cowl lip and the aft cowl lip when the forward cowl lip is in the deployed position. The forward cowl lip has a first radius of curvature. The aft cowl lip has a second radius of curvature. The first radius of curvature is smaller than the second radius of curvature. The propulsion system further includes, but is not limited to, a nozzle assembly disposed downstream of the engine. The nozzle assembly has a variable nozzle throat. The variable nozzle throat is configured to expand and contract between a maximum open state and a minimum open state. The propulsion system still further includes a controller that is operatively coupled with the engine, with the inlet, and with the nozzle assembly. The controller is configured to impose a restriction on a maximum thrust commanded position of the engine when the aircraft is on a ground surface and moving below a predetermined speed. The controller is further configured to lift the restriction when the aircraft is moving at at least the predetermined speed. The controller is further configured to control the inlet to extend the forward cowl lip to the deployed position when the aircraft is on the ground surface. The controller is still further configured to control the nozzle assembly to expand the variable nozzle throat to an extent that will maintain a mass flow passing through the nozzle assembly below a choked condition when the aircraft is on the ground surface and the engine is delivering the maximum power and the forward cowl lip is extended to the deployed position.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
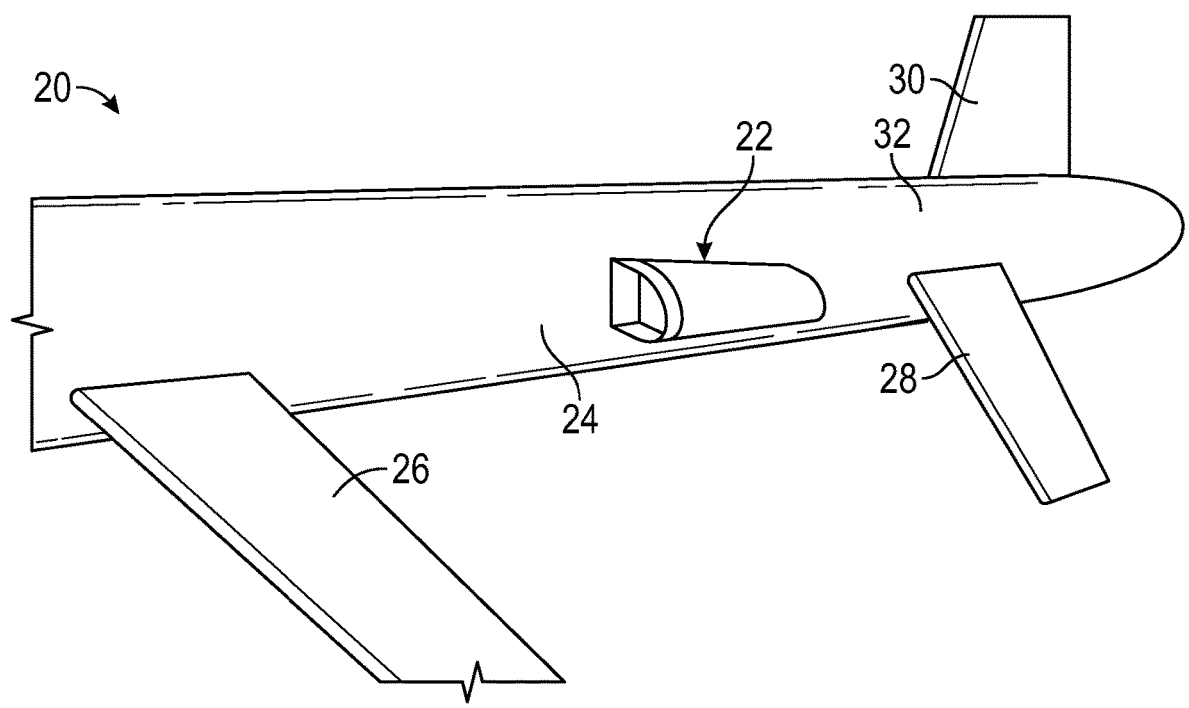
FIG. 1 is a fragmented, perspective view illustrating an aircraft equipped with a non-limiting embodiment of a propulsion system made in accordance with the teachings of the present disclosure.

The following detailed description is merely exemplary in nature and is not intended to limit the invention or the application and uses of the invention. Furthermore, there is no intention to be bound by any theory presented in the preceding background or the following detailed description.

An improved propulsion system for use with an aircraft is disclosed herein. In a non-limiting embodiment, the propulsion system includes an engine, an inlet, and a controller. Other elements, structures, and components may also be present without departing from the teachings of the present disclosure.

The engine is configured to receive a flow of air at a forward end of the engine, to compress the air, to add fuel to the air to form a combustible mixture, to combust the combustible mixture, to convert the combustible mixture into an expanding, high-energy mass flow and to exhaust the expanding, high-energy mass flow in the form of a jet at an aft end of the engine. The engine includes a variety of turbomachinery that enables it to perform these functions. The turbomachinery has a predetermined tolerance for flow distortion.

The inlet is disposed upstream of the engine and includes a forward cowl lip and an aft cowl lip in a tandem arrangement. The forward cowl lip is relatively thin and has a relatively sharp leading edge having a relatively small radius of curvature as compared with the aft cowl lip. Conversely, the aft cowl lip is relatively thick and has a relatively blunt leading edge having a relatively large radius of curvature as compared with the forward cowl lip. The forward cowl lip is separate and distinct from the aft cowl lip and can therefore be moved (e.g., translated fore and aft) with respect to the aft cowl lip. In the embodiments disclosed herein, the forward cowl lip is coupled with the aft cowl lip in a manner that permits the forward cowl lip to move between a retracted position that is adjacent to the aft cowl lip and a deployed position that is spaced apart from the aft cowl lip.

In an embodiment, when the forward cowl lip is in the retracted position, it forms a fluid-tight seal with respect to the aft cowl lip that inhibits a freestream of air from passing between the forward cowl lip and the aft cowl lip. When the forward cowl lip is in the retracted position, the only way for freestream air to enter the inlet is to pass around the sharp, thin leading edge of the forward cowl lip. This means the full engine mass flow enters at the forward lip, setting the attachment point aft of the forward lip, and increases the pressure gradient at the lip. When the forward cowl lip is in the deployed position, then a portion of the freestream of air may pass between the forward cowl lip and the aft cowl lip. Accordingly, when the forward cowl lip is in the deployed position, freestream air may now enter the inlet downstream of the forward cowl lip by passing around the blunter, thicker leading edge of the aft cowl lip. Because the total area where flow is being drawn in is larger, the flow required to move through the limited area at the forward lip is smaller. This moves the attachment point forward and reduces the pressure gradient. Furthermore, the area of translation can be changed to balance the flow moving over the aft or forward lip. This calibration is done to set both the aft and forward pressure gradients, so they are balanced against the risk of separation and flow distortion.

The controller is operatively coupled with the engine and with the inlet. The controller is configured to impose a restriction on a maximum power that the engine can generate, regardless of the throttle's position, when the aircraft is on a ground surface and moving below a predetermined speed. In other words, even if a flight crew member moves the throttle to a position corresponding with a maximum power setting of the engine, if the restriction has been imposed, then the amount of power that the engine will actually generate will be limited to an amount corresponding with the restriction. This may be referred to herein as a "maximum thrust commanded" position of the engine. The controller is further configured to lift the restriction once the aircraft is moving at, or above, the predetermined speed. The controller is further configured to control the inlet to extend the forward cowl lip to the deployed position when the aircraft is on the ground. In a non-limiting embodiment, the predetermined speed may comprise a speed at which a pilot determines if he is going to continue with the takeoff consistent with aircraft requirements for takeoff distance or if he is going to abort the take off. In some embodiments, this speed may correspond with the aircraft the pilot is operating. As used herein, this speed will be referred to as the "V1 decision speed".

When the aircraft is moving below the predetermined speed, the amount of air drawn into the inlet from the side and from the rear is quite substantial. By limiting engine power when the aircraft is moving below the predetermined speed, the controller reduces the pressure gradient at the lip as less flow must enter the inlet. Therefore, that air will have an increased likelihood of remaining attached to the surface of the inlet as it makes the turn. In addition, by moving the forward cowl lip to the deployed position, the free stream will now pass between the two cowl lips reducing the local suction and pass over the blunter, thicker aft cowl lip which can withstand a larger pressure gradient. This, together with the engines reduced mass flow rate will increase the likelihood that the air flow entering the inlet will remain attached to the inlet's surfaces, thus reducing the amount and/or magnitude of the flow distortion.

Once the aircraft reaches the predetermined speed, the attachment point for the capture stream tube moves forward on the lip reducing the pressure gradient. For this reason, the need for the limitation on maximum engine power goes away. Accordingly, the controller is configured lift the restriction on engine power allowing the engine to generate its actual maximum amount of power. However, at this stage, mass flow has not yet dropped to a level that entirely avoids the risk of flow separation on a single lip, so the controller is configured to maintain the forward cowl lip in the deployed position until the aircraft has taken off. Once the aircraft is airborne, the aircraft is moving at a speed that ensures that the capture stream tube attaches close to the lip, further reducing the pressure gradient to a point such that the mass flow can remain attached. Accordingly, the controller is configured to control the inlet to retract the forward cowl lip once the pressure gradient can be tolerated by the forward lip alone. Retracting the forward cowl lip for takeoff also has a favorable effect on the magnitude of the noise generated by the propulsion system, quieting it down substantially and helping the propulsion system to satisfy regulatory restrictions on noise emissions.

In a non-limiting embodiment, the forward cowl lip will remain in the retracted position for so long as the aircraft remains airborne. Once the aircraft lands, the process is reversed. The controller will control the inlet to move the forward cowl lip to the deployed position and the controller will keep the forward cowl lip in that position for so long as the aircraft is on the ground and the propulsion system is operating. As the aircraft decelerates on the ground, once its speed falls below the predetermined speed, the controller will again impose the restriction on the maximum amount of power that the engine can generate. In other embodiments, variations and/or deviations from this protocol may be employed.

In other non-limiting embodiments, the deployable cowl lip may be deployed only when the aircraft is on the ground and moving above a predetermined speed. In addition, upon landing, the deployable cowl lip may not be deployed until the aircraft slows to a second predetermined speed.

A greater understanding of the propulsion system discussed above may be obtained through a review of the illustrations accompanying this application together with a review of the detailed description that follows.

FIG. 1 is a fragmented, perspective view illustrating an aircraft 20 equipped with a non-limiting embodiment of a propulsion system 22 made in accordance with the teachings of the present disclosure. Aircraft 20 is configured to travel at speeds equal to and exceeding the local speed of sound (referred to alternately hereinafter as "supersonic" speeds). Propulsion system 22 is configured to generate sufficient thrust to facilitate operation of aircraft 20 at supersonic speeds. In some embodiments, propulsion system 22 may be designed to propel aircraft 20 at a specific supersonic speed at which aircraft 20 was designed to travel for protracted periods of time (referred to as "supersonic cruise"). Although the context of this disclosure is an aircraft designed to fly at supersonic speeds, it should be understood that the teachings disclosed herein are not so limited. Rather, the teachings disclosed herein may also be used with jet aircraft that are designed to fly at speeds below supersonic speeds without departing from the teachings of the present disclosure.

In the illustrated embodiment, propulsion system 22 is a podded propulsion system that is mounted directly to a fuselage 24 of aircraft 20. It should be understood that the teachings disclosed herein are not limited to the illustrated configuration. Rather, in other embodiments, propulsion system 22 may be a podded propulsion system that is mounted to other parts of aircraft 20, including, but not limited to a wing 26, a horizontal stabilizer 28, a vertical stabilizer 30, an empennage 32, as well as to any other suitable portion of aircraft 20 that is effective to support a podded propulsion system. In still other embodiments, propulsion system 22 may not comprise a podded propulsion system, but rather, may comprise an embedded propulsion system that is incorporated directly into fuselage 24 or wing 26 or empennage 32 or into any other suitable portion of aircraft 20 effective to support a propulsion system.

Figure 2:
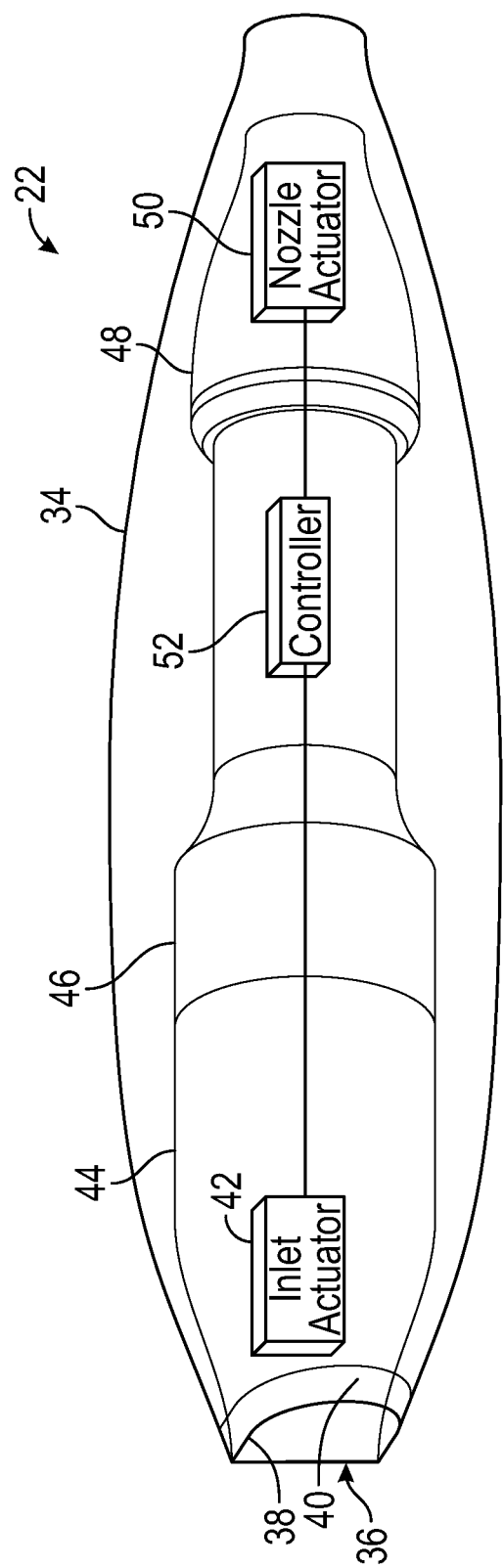
FIG. 2 is an expanded, transparent, perspective view illustrating the propulsion system of FIG. 1.

With continuing reference to FIG. 1, FIG. 2 is an expanded, transparent, perspective view illustrating propulsion system 22. Propulsion system 22 includes a nacelle 34 (nacelle 34 has been illustrated transparently to reveal the components that lie beneath), an inlet 36 including a forward cowl lip 38 and an aft cowl lip 40, an inlet actuator 42, a diffuser 44, a jet engine 46, a nozzle assembly 48, a nozzle actuator 50, and a controller 52. In other embodiments, propulsion system 22 may include either fewer components or additional components without departing from the teachings of the present disclosure.

During a flight of aircraft 20, an oncoming supersonic freestream of air ("freestream") will be captured by inlet 36, pass through forward cowl lip 38, and enter diffuser 44. As the captured freestream enters inlet 36, it will pass through a terminal shock (not shown). When it passes through the terminal shock, the captured freestream will decelerate to subsonic speeds before entering the diffuser. As the captured freestream passes through the diffuser, it will slow it down even further to speeds that are compatible with the turbomachinery (not shown) of jet engine 46. The slowed, captured freestream will then enter and pass through jet engine 46. As it passes through jet engine 46, it will undergo a series of rapid changes. First, it will be compressed to increase its density and temperature. As the slowed, dense, warm captured freestream continues downstream through jet engine 46, it will next be combined with a combustible fuel to form a slowed, dense, warm combustible gaseous mixture. As this gaseous mixture continues downstream through jet engine 46, it will be ignited and combusted. Once combusted, it will rapidly and energetically expand in a downstream direction and leave jet engine 46 in the form of a jet of hot, expanding, high pressure fluid. This jet of hot, expanding, high pressure fluid will enter nozzle assembly 48 as it continues downstream. The temperature of the exhausted jet will vary depending upon the configuration of the engine. Nozzle assembly 48 has an internal pathway (not shown in FIG. 2) that is configured to guide and focus the jet in a way that is intended to control the thrust imparted by the jet as it exits an aft end of nozzle assembly 48, and balance the engine pressure ratio to optimize the condition based efficiency.

As discussed in detail below, controller 52 will control inlet actuator 42 in a manner that ensures that the freestream is sufficiently free of flow distortion. As also discussed below, controller 52 will control nozzle actuator 50 in a manner that, adjusts the exit velocity and back pressure to enhance the ability of the turbomachinery of jet engine 46 to handle whatever flow distortion remains in the freestream, and reduce aircraft noise signature.

Figure 3:
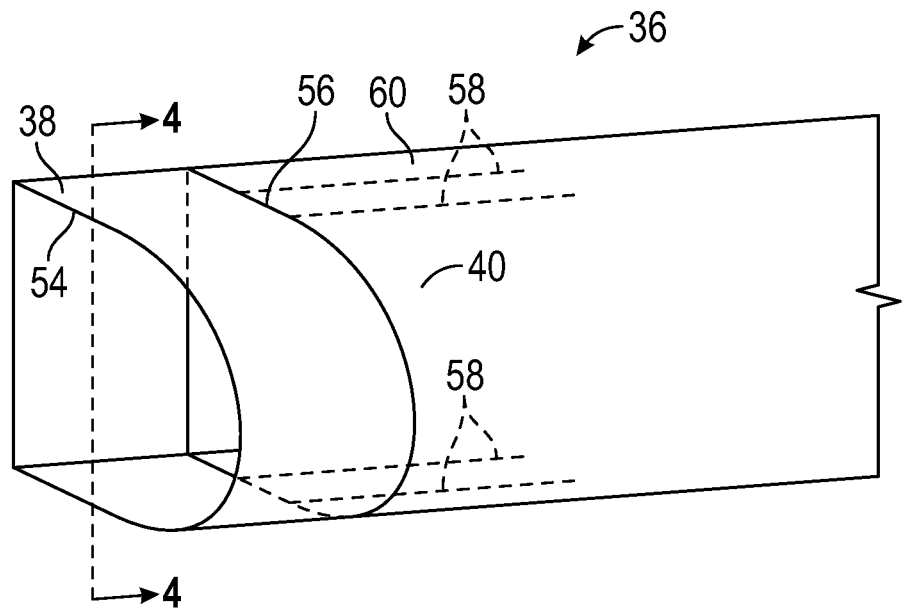
FIG. 3 is an expanded, fragmented, perspective view illustrating a non-limiting embodiment of an inlet of the propulsion system of FIG. 1, with a forward cowl lip disposed in a retracted position.

With continuing reference to FIGS. 1-2, FIG. 3 is an expanded, fragmented, perspective view illustrating a non-limiting embodiment of inlet 36 of propulsion system 22. In the illustrated embodiment, inlet 36 is depicted as a pitot inlet having a D-shaped, two-dimensional configuration. It should be understood that propulsion system 22 is not limited to use with inlets having the illustrated configuration and that in other embodiments, propulsion system 22 may have any suitable configuration that is effective to support the intended operations of the propulsion system.

Inlet 36 is the component of propulsion system 22 that captures a portion of the freestream and directs it downstream towards engine 46. As set forth above, inlet 36 includes forward cowl lip 38 and aft cowl lip 40.

Forward cowl lip 38 has a relatively sharp leading edge 54, a relatively thin profile, and a relatively small radius of curvature as compared with aft cowl lip 40. Such a configuration makes forward cowl lip 38 well suited to support operation of propulsion system 22 during periods when aircraft 20 is flying at high subsonic and/or supersonic speeds by substantially minimizing both the amount and the magnitude of the shocks and the drag generated by inlet 36.

Aft cowl lip 40 has a relatively blunt leading edge 56, a relatively thick profile, and a relatively large radius of curvature as compared with forward cowl lip 38. Such a configuration makes aft cowl lip 40 well suited to support operation of propulsion system 22 during periods when aircraft 20 is moving on the ground (e.g., taxiing, taking off, landing) at low subsonic speeds by sharing the lip loading required to maintain engine mass flow rates between the forward and aft lip. Load sharing is calibrated by the translation distance of the forward lip, and most of the load will rest on the aft lip with the more separation resistance lip radius. By helping to ensure that the freestream of air entering inlet 36 has acceptable levels of flow separation, aft cowl lip 40 helps to reduce/minimize/eliminate flow distortion in the air that is directed towards, and received by, jet engine 46.

Forward cowl lip 38 is a separate and distinct component from aft cowl lip 40. However, in FIG. 3, forward cowl lip 38 and aft cowl lip 40 are illustrated in a tandem arrangement with forward cowl lip 38 disposed immediately adjacent to, and contiguous with, aft cowl lip 40. When forward cowl lip 38 is disposed adjacent to, and contiguous with, aft cowl lip 40, forward cowl lip 38 is disposed in a retracted position. When forward cowl lip 38 is disposed in the retracted position, the freestream of air moving downstream past leading edge 54 on the outside of inlet 36 is inhibited from entering inlet 36 at leading edge 56 (i.e., it is inhibited from passing between forward cowl lip 38 and aft cowl lip 40) because of the adjacent and contiguous arrangement between forward cowl lip 38 and aft cowl lip 40.

Figure 4:
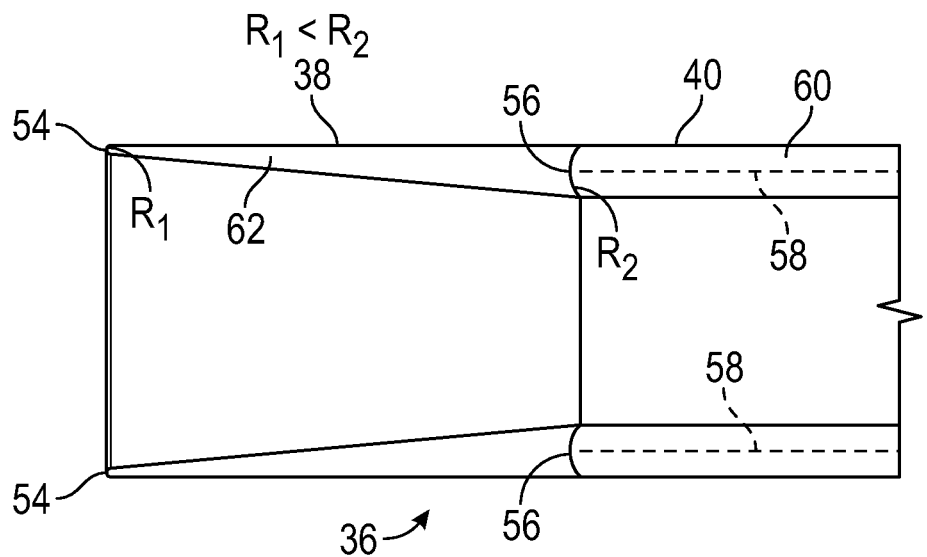
FIG. 4 is a cross-sectional, fragmented view illustrating the inlet of FIG. 3 with a section taken along the line 4-4 of FIG. 3.
Figure 5:
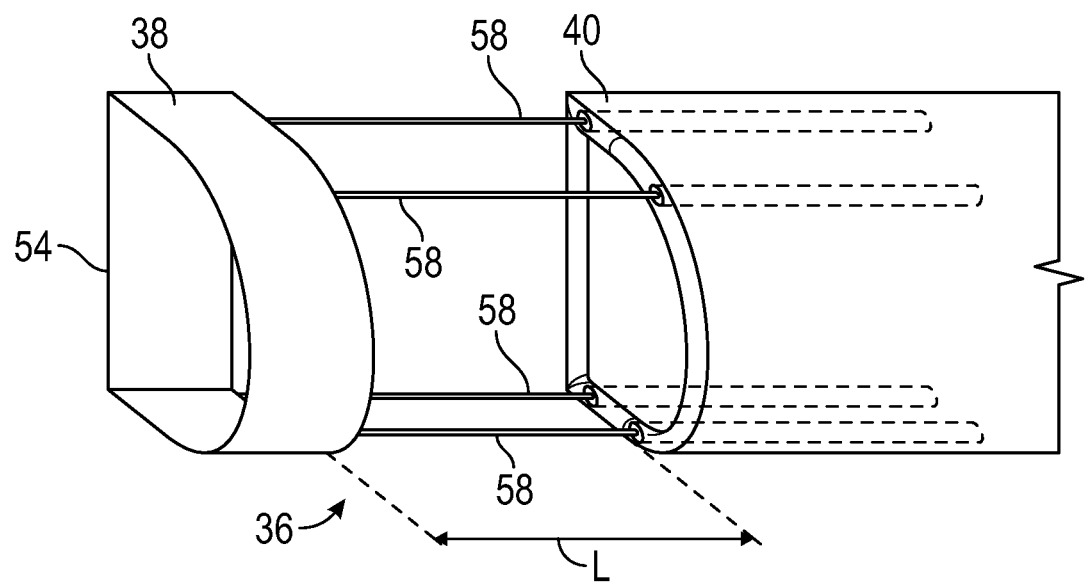
FIG. 5 is a fragmented, perspective view illustrating the inlet of FIG. 3 with the forward cowl lip disposed in a deployed position.

Inlet 36 further includes four struts 58 embedded within a wall 60 of inlet 36. While four struts are illustrated in the embodiment presented in the accompanying figures, it should be understood that in other embodiments, any suitable number of struts that are effective to move the forward cowl lip between a retracted position and a deployed position may be employed. Struts 58 are illustrated in phantom lines. The struts are configured to move between an aft position (as seen in FIGS. 3 and 4) and a forward portion (as seen in FIG. 5). The struts are coupled at their distal ends (i.e., at their left-most ends from the perspective of FIG. 3) to forward cowl lip 38. In the illustrated embodiment, struts 58 are illustrated in the aft position. When struts 58 move to their aft position, they move forward cowl lip 38 to its retracted position. While struts 58 remain in their aft position, they will support/retain forward cowl lip 38 in its retracted position. When struts 58 move to their forward position, they will move forward cowl lip 38 to its deployed position. While struts 58 remain in their forward position, they will support/retain forward cowl lip 38 in its deployed position. Movement of struts 58 between the aft position and the forward position is controlled by inlet actuator 42. It should be understood that although the illustrated embodiment depicts the mechanism for moving forward cowl lip 38 between its deployed and retracted positions as being extendable struts 58 and inlet actuator 42, any other mechanism that is effective to move forward cowl lip 38 between it deployed and retracted positions may alternately be employed without departing from the teachings of the present disclosure.

With continuing reference to FIGS. 1-3, FIG. 4 is a cross-sectional, fragmented view illustrating inlet 36 in a section taken along the line 4-4 of FIG. 3. In FIG. 4, the relatively sharp configuration of leading edge 54 and the relatively thin configuration of a wall 62 of forward cowl lip 38 are presented with a clearly visible contrast to the relatively blunt configuration of leading edge 56 and the relatively thick configuration of wall 60 of aft cowl lip 40. Also presented in FIG. 4 are the relative sizes of the radii of curvature of forward cowl lip 38 and aft cowl lip 40. Leading edge 54 of forward cowl lip 38 has a radius of curvature $R_1$. Leading edge 56 of aft cowl lip 40 has a radius of curvature $R_2$. As illustrated, $R_1$ is smaller than $R_2$. Conversely, $R_2$ is greater than $R_1$. It should be understood that the appearance of the curvatures of forward cowl lip 38 and of aft cowl lip 40 in the accompanying illustrations are exemplary only and are not necessarily drawn to scale. Accordingly, they are not limiting and they are not necessarily reflective of the actual curvatures that may ultimately be employed on the forward or aft cowl lips used in a commercial embodiment.

The magnitude of radius of curvature $R_2$ is based, at least in part, on the tolerance for flow distortion of jet engine 46. As discussed above, flow distortion is caused by flow separation at the cowl lip. If the cowl lip has a radius of curvature that is too small to permit the flow of air passing over the cowl lip to remain attached, the flow will become separated. This separation will cause the formation of recirculating regions of low pressure that will then be drawn into the inlet. Once these low-pressure regions of air enter the inlet, they blend into the incoming flow of air and form flow distortions. $R_2$ is limited to the cowl thickness at the aft location, a smooth ellipse is created using the maximum thickness and seeking to smooth the pressure gradient into the inlet. Once the smoothest contour is determined, the translation of the system is set to balance the loading between the forward and aft lip to minimize separations. Optimally, the system will be calibrated to avoid flow separation altogether.

Also visible in FIG. 4 is a nested engagement between an aft end of forward cowl lip 38 and leading edge 56 of forward cowl lip 40. In some embodiments, the aft end of forward cowl lip 38 may be manufactured with a curvature that matches the curvature of leading edge 56. In other embodiments, an aft end of forward cowl lip 38 may be coated or covered by a compressible material that deforms to accommodate the curvature of leading edge 58. In still other embodiments, any other suitable configuration that is effective to provide a substantially fluid tight coupling between an aft end of forward cowl lip 38 and leading edge 56 of aft cowl lip 40 when forward cowl lip 38 is in the retracted position may also be employed without departing from the teachings of the present disclosure.

Also presented in FIG. 4 is the embedded relationship between wall 60 and struts 58. Wall 60 may include cylindrical silos in which struts 58 are housed. In other embodiments, channels may be defined in wall 60 to house struts 58. In other embodiments, struts 58 may be mounted in a sliding arrangement with respect to a surface of wall 60. In still other embodiments, any other suitable arrangement that is effective to facilitate the movement of forward cowl lip 38 between the retracted position and the deployed position may be employed without departing from the teachings of the present disclosure.

With continuing reference to FIGS. 1-4, FIG. 5 is a fragmented, perspective view illustrating inlet 36 with forward cowl lip 38 disposed in the deployed position. Correspondingly, struts 58 are disposed in their respective forward positions, having been moved there by inlet actuator 42 (not shown in FIG. 5). With forward cowl lip 38 disposed in the deployed position, an aft end of forward cowl lip 38 is now spaced apart from leading edge 56 of aft cowl lip 40 by a distance L. Being spaced apart in this manner provides a pathway along which the freestream may enter inlet 36 between forward cowl lip 38 and aft cowl lip 40. This allows the required mass flow to pass through a larger area 36 reducing the suction pressure on leading edge 54 and leading edge 56. That pressure gradient can then be tailored by the translation distance L for the leading edge 54. This is helpful at static and low speed conditions as the surrounding flow has little momentum and is prone to separation.

The distance L between the trailing edge of forward cowl lip 38 and leading edge 56 of aft cowl lip 40 may be determined based on the tolerance limits of jet engine 46 for flow distortion. The design develops from knowing the cowl thickness which is a by-product of turbo machinery and external shaping for drag reduction, then integrating an aft lip that minimizes the pressure gradient over it. Finally, distance L is set to balance the loading between leading edge 54 and leading edge 56 in a way that minimizes the distortion that propagates downstream to the fan face.

Once the flow separation tolerance of jet engine 46 is known, then using leading edge 54, which is designed for highspeed, and the maximum radius aft leading edge 56 which is determined by structural volume, it will be possible to determine the length L that yields an amount of flow separation within the manufacture's tolerance for flow separation. Evaluation of this is done using computer aided design, and computational fluid dynamics.

Once the length L is known, then the lengths of struts 58 and/or the length of travel of struts 58 can be calculated. In embodiments where means and/or mechanisms other than struts 58 and inlet actuator 42 are used to move forward cowl lip 38 from the retracted position to the deployed position, then length L can be used to facilitate the calibration of such other deployment means and mechanisms.

Figure 6:
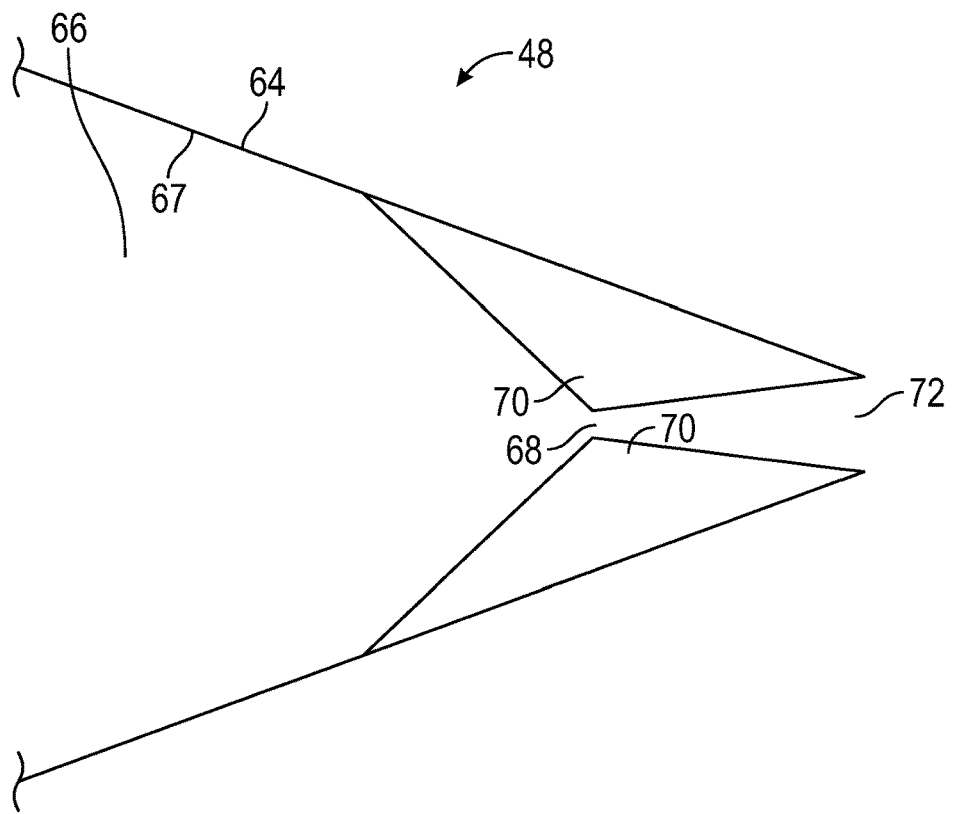
FIG. 6 is an expanded, fragmented, schematic view illustrating a non-limiting embodiment of a nozzle assembly of the propulsion system of FIG. 1, with an expandable and contractable nozzle throat disposed in a minimum open state.

With continuing reference to FIGS. 1-5, FIG. 6 is an expanded, fragmented, schematic view illustrating a portion of a non-limiting embodiment of nozzle assembly 48. The portion of nozzle assembly 48 illustrated in FIG. 6 is the aft end of the nozzle assembly. Nozzle assembly 48 includes a nozzle body 64. Nozzle body 64 houses the various components of nozzle assembly 48, most of which have been omitted for purposes of simplification. Inside of nozzle body 64 is a pathway 66. In the illustrated embodiment, pathway 66 is defined by internal wall 67 of nozzle body 64. Pathway 66 is configured to receive the jet exhausted by jet engine 46 and to guide and compress the jet as it advances downstream for the purposes of increasing the magnitude of the thrust that the jet will impart to aircraft 20 as it exits propulsion system 22. Nozzle assembly 48 further includes a nozzle throat 68. Nozzle throat 68 comprises the location in nozzle assembly 48 having the smallest cross-sectional area. In the illustrated embodiment, nozzle throat 68 can be selectively expanded and contracted. It should be understood that the illustrations presented in the patent figures are not drawn to scale, but rather are exaggerated for the purposes of drawing distinctions between the dimensions of the various nozzle throat configurations. Accordingly, the illustrations are merely exemplary in nature and are not limiting.

Nozzle assembly 48 further includes a variable protrusion 70. Variable protrusion 70 is configured to selectively expand and contract (see FIG. 7 for an illustration of variable protrusion 70 in a different state of expansion/contraction). Variable protrusions such as variable protrusion 70 are well known in the art. The selective expansion and contraction of variable protrusion 70 is what enables nozzle throat 68 to be selectively expanded and contracted. As variable protrusion 70 expands, nozzle throat 68 contracts, and as variable protrusion contracts, nozzle throat 68 expands. While nozzle assembly 48 includes a variable protrusion to accomplish the expansion and contraction of nozzle throat 68, it should be understood that any other suitable mechanism that is effective to cause the nozzle throat to expand and contract may alternately be used in nozzle assembly 48 without departing from the teachings of the present disclosure. For example, and without limitation, a translating shroud, a translating center body, and a translating shroud in conjunction with a translating center body may be used to provide nozzle assembly 48 with a throat that can be selectively expanded and contracted.

In FIG. 6, variable protrusion 70 is expanded to the greatest extent possible for the illustrated embodiment. Correspondingly, nozzle throat 68 has the smallest cross-sectional area possible for the illustrated embodiment. This state of expansion and contraction for variable protrusion 70 and nozzle throat 68, respectively, gives pathway 66 a converging/diverging configuration. When a propulsion system's nozzle pathway has a converging/diverging configuration, then, depending upon the magnitude of the pressure of the jet, the jet will choke (i.e., achieve sonic speed) when it reaches the nozzle throat. When the choked jet passes through the nozzle throat and then expands as it continues downstream through the diverging portion of pathway 66, the jet will accelerate to supersonic speeds. Accordingly, when nozzle assembly 48 is configured with variable protrusion 70 expanded in the manner illustrated in FIG. 6 to yield a converging/diverging nozzle throat, and when the jet exhausted by jet engine 46 has sufficient pressure to become choked at nozzle throat 68, then the exhaust plume that passes through nozzle exit 72 will be supersonic and will deliver an amount of thrust to aircraft 20 that will be sufficient to accelerate aircraft 20 to supersonic speeds and will also be sufficient to maintain steady flight of aircraft 20 at supersonic speeds. To maximize the thrust imparted by the jet, the nozzle ratio (the ratio of the cross-sectional area of nozzle exit 72 to the cross-sectional area of nozzle throat 68) should be set to a ratio that will permit the jet to achieve a fully expanded state as it reaches nozzle exit 72.

With continuing reference to FIGS. 1-6, FIG. 7 is a fragmented, schematic view illustrating nozzle assembly 48, with variable protrusion 70 contracted to its smallest state. In this configuration, nozzle assembly 48 is considered to be "fully open".

With variable protrusion 70 contracted to its smallest state, the narrowest cross-sectional area of pathway 66 (i.e., the throat) no longer corresponds with the location of a peak 74 of variable protrusion 70. Rather, in this configuration, nozzle exit 72 has the smallest cross-sectional area. Consequently, in the configuration shown in FIG. 7, nozzle exit 72 serves as nozzle throat 68 for nozzle assembly 48.

Figure 7:
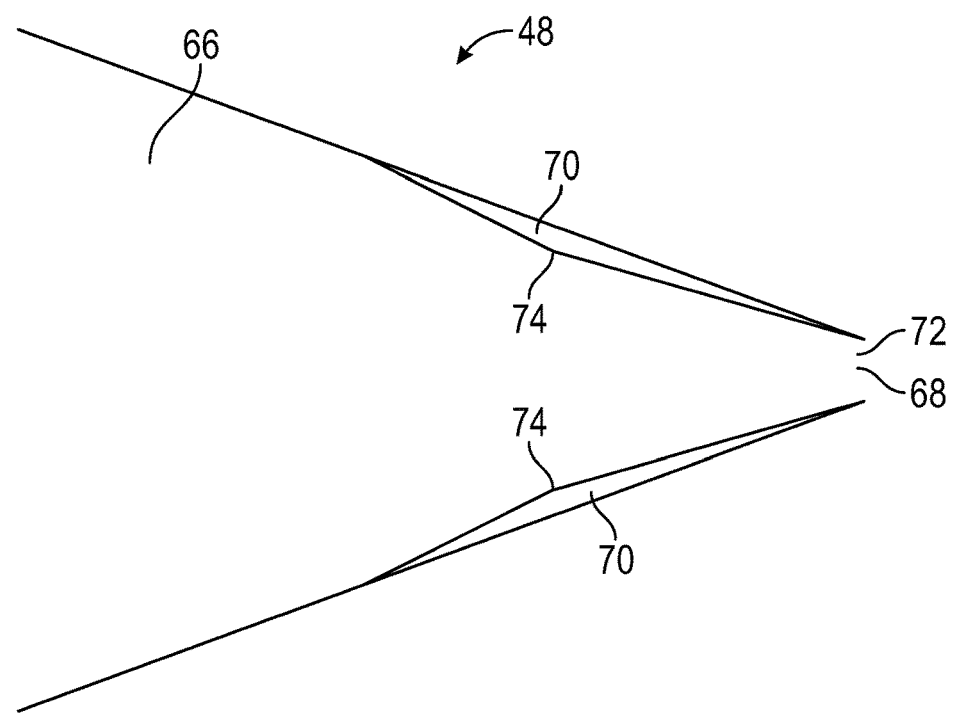
FIG. 7 is a fragmented, schematic view illustrating the nozzle assembly of FIG. 6, with the expandable and contractable nozzle throat disposed in a maximum open state.

In the configuration illustrated in FIG. 7, pathway 66 no longer has a converging/diverging configuration. Rather, as illustrated in FIG. 7, pathway 66 has a contour that continuously converges starting from the exhaust exit of jet engine 46 (not shown in FIG. 7) and continuing through nozzle exit 72. Configured in this manner, the jet will not choke before reaching nozzle exit 72. Therefore, the jet will not exit nozzle assembly 48 at supersonic speeds. Furthermore, the pressure of the jet can be manipulated by jet engine 48 and/or by the controller controlling jet engine 48 (not shown in FIG. 7) to ensure that the jet does not choke at exit 72. The ability to prevent the jet from choking is desirable because if the jet can be maintained at a sub-sonic speed when exiting nozzle assembly 48, then the jet will generate a much lower amount of noise. This is important to satisfy government regulations that place restrictions on the amount of noise a jet engine is permitted to generate when taking off and/or landing.

In addition to generating lower levels of noise, it has been determined that when nozzle assembly 48 is configured as illustrated in FIG. 7 (i.e., in the fully open state), this provides jet engine 46 with an enhanced ability to tolerate flow distortion. Accordingly, in addition to moving forward cowl lip to the deployed position when aircraft 20 is on the ground and taxiing and/or taking off, it is desirable to place nozzle assembly 48 in the fully open state.

With respect to FIGS. 6 and 7, nozzle assembly 48 has been illustrated in its most closed state (FIG. 6) and its fully open state (FIG. 7). In some embodiments, nozzle assembly 48 may be configured to toggle back and forth between these two configurations. In other embodiments, nozzle assembly 48 may be configured to vary the extent to which variable protrusion 70 expands and contracts. This would allow nozzle throat 68 to have a corresponding variation in cross-sectional areas.

Figure 8:
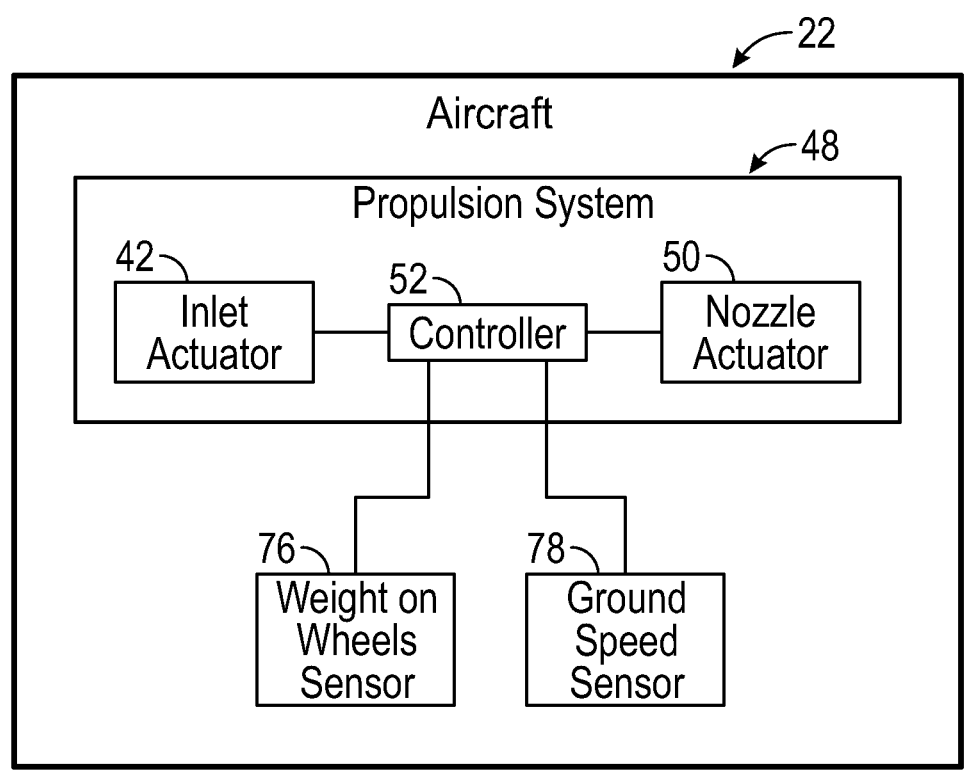
FIG. 8 is a block diagram schematically illustrating the aircraft and the propulsion system of FIG. 1.

With continuing reference to FIGS. 1-7, FIG. 8 is a block diagram schematically illustrating aircraft 22. As illustrated in FIG. 8, aircraft 22 includes propulsion system 48. As discussed above, propulsion system 48 includes inlet actuator 42 which is configured to move forward cowl lip 38 between the deployed position and the retracted position. Propulsion system 48 also includes nozzle actuator 50 which controls the expansion and contraction of nozzle throat 68. Propulsion system 50 further include controller 52 whose configuration and functionality will be discussed in great detail below.

Aircraft 22 as illustrated in FIG. 8 further includes two additional components not previously discussed when describing earlier figures. Those two components are a weight-on-wheels sensor 76 and a ground speed indicator 78. Weight-on-wheels sensor 76 and ground speed indicator 78 are components that are well known in the relevant art. Weight-on-wheels sensor 76 is coupled with the landing gear of aircraft 22 and configured to detect when the landing gear is under load. When the landing gear is under load, then aircraft 22 is on the ground. When the weight-on-wheels sensor 76 detects that there is no load on the landing gear (i.e., the absence of a load), then aircraft 22 is not on the ground. In this manner, weight-on-wheels sensor 76 obtains information relating to whether aircraft 22 is airborne or on the ground. Ground speed indicator 78 is coupled with the wheels of the landing gear of aircraft 22. Ground speed indicator 78 operates in substantially the same manner as an automobile speedometer. Ground speed indicator 78 is configured to detect the rate at which the wheels of the landing gear are spinning. Based on the rotational speed, ground speed indicator 78 is configured to calculate the speed at which aircraft 22 is rolling respect to the ground. In some embodiments, ground speed indicator may only detect the rotational speed of the wheels of the landing gear and then provide that information to a processor on board aircraft 22 that is configured to calculate the ground speed of aircraft 22 using the information supplied by ground speed indicator 78. It should be understood that there are multiple ways to detect when an aircraft is airborne, when an aircraft is on the ground, and the speed at which the aircraft is moving when on the ground. The present disclosure is not limited to the specific embodiments, sensors and/or detectors described above.

Controller 52 may be any type of computer, controller, micro-controller, circuitry, chipset, computer system, or microprocessor that is configured to perform algorithms, to execute software applications, to execute sub-routines and/or to be loaded with, and to execute, any other type of computer program. Controller 52 may comprise a single processor or a plurality of processors acting in concert. In some embodiments, controller 52 may be dedicated for use exclusively with propulsion system 22. In other embodiments controller 52 may be shared with other systems onboard aircraft 20. For example, and without limitation, controller 52 may comprise a full authority digital electronic controller (FADEC) that monitors and controls engine operations and that is further configured to perform the additional functions described in the present disclosure. Alternatively, controller 52 may be communicatively coupled with a FADEC that controls jet engine 46 and controller 52 may convey instructions relating to control of jet engine 46 to the FADEC for execution. In a further alternate embodiment, controller 52 may be communicatively coupled with any other controller that, in turn, is responsible for controlling jet engine 46. In this further alternate embodiment, controller 52 may convey instructions relating to control of jet engine 46 to the other controller for execution.

Controller 52 is communicatively coupled with weight-on-wheels sensor 76 and ground speed sensor 78 and is operatively coupled with inlet actuator 42 and with nozzle actuator 50. Such couplings may be accomplished via any suitable means of transmission including both wired and wireless connections. For example, each component may be physically connected to controller 52 via a coaxial cable or via any other type of wire connection effective to convey signals. In the embodiment illustrated in FIG. 8, controller 52 is directly coupled to each of the other components. In other embodiments, each component may be communicatively coupled with controller 52 across a vehicle bus. In still other examples, each component may be wirelessly coupled with controller 52 via a Bluetooth connection, a WiFi connection or the like. Other coupling arrangements are also possible and the use of such other coupling arrangements would not constitute a departure from the teachings of the present disclosure.

Being communicatively and/or operatively coupled provides a pathway for the transmission of commands, instructions, interrogations and other signals between controller 52 and each of the other components. Through this communicative coupling, controller 52 may control and/or communicate with each of the other components. As discussed below, each of the other components discussed above are configured to interface and engage with controller 52.

Weight-on wheels sensor 76 and ground speed sensor 78 may be configured to receive interrogations from controller 52 and to provide information relating to the state of weight on wheels of aircraft 20 and the ground speed of aircraft 20, respectively, in response to such interrogations. Alternatively, weight-on-wheels sensor 76 and ground speed sensor 78 may be configured to periodically transmit information to controller 52 relating to the state of weight-on-wheels of aircraft 20 and the ground speed of aircraft 20, respectively. In other embodiments, weight-on-wheels sensor 76 and ground speed sensor 78 may be configured to transmit information to controller 52 relating to the state of weight-on-wheels of aircraft 20 and the state of the ground speed of aircraft 20 anytime those states undergo a change in status. Other configurations for obtaining and/or providing information relating to the status of the weight-on-wheels and the ground speed of aircraft 20 may alternatively be employed without departing from the teachings of the present disclosure.

Additionally, inlet actuator 42 may be configured to communicate a current state of deployment or retraction of forward cowl lip 38 and/or the forward or aft positioning of struts 58 to controller 52 via the operative coupling. Inlet actuator 42 may be further configured to receive instructions/commands from controller 52 via the operative coupling and to execute, comply with and/or carry out such instructions. For example, controller 52 may provide an instruction to inlet actuator 42 to deploy or retract forward cowl lip 38 or to move strut 58 between the forward and aft position and inlet actuator 42 would then actuate in response to the instruction in a manner that achieves the instructed result.

Similarly, nozzle actuator 50 may be configured to communicate a current state of expansion/contraction of nozzle throat 68 to controller 52 via the operative coupling. Nozzle actuator 50 may be further configured to receive instructions/commands from controller 52 via the operative coupling and to execute, comply with, and/or carry out such instructions. For example, controller 52 may provide an instruction to nozzle actuator 50 to expand or contract nozzle throat 68 and nozzle actuator 50 would then actuate in response to the instruction in a manner that achieves the instructed result.

Controller 52 may be configured to directly control the turbomachinery and the mechanisms of jet engine 46. In this case, in response to receiving information from weight-on-wheels sensor 76 and/or from ground speed sensor 78, controller 52 may be configured to directly implement changes to the operational settings of jet engine 46. In other embodiments, a separate controller (e.g., a FADEC) may have responsibility for controlling the turbomachinery and the mechanisms of jet engine 46. In such other embodiments, controller 52 would be operatively or communicatively coupled with such other controller and would convey instructions and/or commands relating to desired changes to the operational settings of the turbomachinery of jet engine 46 to such other controller for execution via the communicative and/or operative coupling.

Controller 52 is configured to interact with, coordinate and/or orchestrate the activities of each of the other components of propulsion system 48 and to interact with, and communicate with, weight-on-wheels sensor 76 and ground speed sensor 78 for the purpose of ensuring that flow distortion is maintained at or below a predetermined threshold that is either equal to or less than the tolerance for flow distortion of jet engine 46. To achieve this result, controller 52 has been programmed with numerous protocols and algorithms. These various protocols and algorithms will be discussed in detail below.

In an embodiment, controller 52 is configured to impose a restriction on the maximum power requested from jet engine 46 when aircraft 20 is on the ground and moving at a speed below a predetermined speed. This limitation on maximum engine power will reduce the mass flow of the freestream entering inlet 26 which, in turn, will reduce the pressure gradient and magnitude of flow distortion experienced by jet engine 46.

To assess whether to impose the restriction on jet engine 46, controller 52 is configured to obtain information from ground speed sensor 78 indicative of the speed of aircraft 22 and is further configured to use that information to assess whether aircraft 20 is moving below the predetermined speed. When the information obtained from ground speed sensor 78 indicates that aircraft 20 is moving below the predetermined speed, then controller 52 will impose a restriction on jet engine 46. The restriction will reduce the maximum thrust of jet engine 46 to a predetermined percentage of the actual maximum power that jet engine 46 is capable of producing. In another embodiment, the restriction may be based on an amount of power reduction that is needed to ensure that the amount of flow distortion experienced by jet engine 46 falls below its predetermined tolerance for flow distortion. In another embodiment, the restriction may be based on an amount of power reduction that is needed to ensure that the amount of flow separation of the freestream entering inlet 36 falls to zero. In another embodiment, the restriction may be based on an amount of power reduction that is needed to ensure that the amount of flow distortion experienced by jet engine 46 when forward cowl lip 38 is situated in the deployed position falls below a predetermined tolerance for flow distortion of jet engine 46. In another embodiment, the restriction may be based on an amount of power reduction that is needed to ensure that the amount of flow separation of the freestream entering inlet 36 falls to zero when forward cowl lip 38 is situated in the deployed position. When the information obtained from ground speed sensor 78 indicates that aircraft 20 is moving at or above the predetermined speed, controller 52 is configured to lift the throttle restriction and to permit jet engine 46 to generate the maximum amount of power that it is actually capable of generating.

In another embodiment, controller 52 is configured to control inlet 36 to move forward cowl lip 38 to the deployed position. The repositioning of forward cowl lip 38 from the retracted position to the deployed position will increase the area for the flow to enter the inlet lowering the total pressure gradient but will also introduce another aft cowl lip 40 which will assist in balancing the lip loading through translation L to minimize the likelihood of either lip separating reducing the amount of flow distortion experienced by jet engine 46.

To assess whether to move forward cowl lip 38 to the deployed position, controller 52 is configured to obtain information from the weight-on-wheel sensor 76 indicative of whether aircraft 20 is on the ground or not. When the information obtained from weight-on-wheel sensor 76 indicates that aircraft 20 is on the ground, then controller 52 will provide an instruction to inlet actuator 42 to move struts 58 from their aft position to their forward position. This, in turn will move forward cowl lip 38 from its retracted position to its deployed position. Controller 52 is further configured to maintain forward cowl lip 38 in its deployed position for so long as aircraft 20 remains on the ground. When the information obtained from weight-on-wheels sensor 76 indicates that aircraft 20 is no longer on the ground, controller 52 is configured to provide an instruction to inlet actuator 42 to move struts 58 from their forward position to their aft position. This in turn will move forward cowl lip 38 from its deployed position to its retracted position. Controller 52 is further configured to maintain forward cowl lip in the retracted position for so long as aircraft 20 remains off the ground and propulsion system 22 is operating. In another non-limiting embodiment, rather than using information provided by weight-on-wheels sensor 76 to determine when to deploy or retract forward cowl lip 38, controller 52 may be configured to receive information from one or more sensors relating to a wheel speed of a wheel of aircraft 20 and to deploy or retract forward cowl lip 38 based on the wheel speed exceeding or falling below a predetermined wheel speed.

In an embodiment, controller 52 may be further configured to control inlet 36 to move forward cowl lip 38 to the deployed position when propulsion system 22 is switched on from an off state, regardless of whether aircraft 20 is moving. Accordingly, when propulsion system 22 is on and operating at an idle condition while aircraft 20 stands still, forward cowl lip 38 will be situated in the deployed position. Controller 52 may be further configured to control inlet 36 to move forward cowl lip 38 to the retracted position whenever propulsion system 22 is switched off.

In another embodiment, controller 52 is configured to control nozzle throat 68 to expand to either a fully open state or to any other state that is sufficient to prevent the jet produced by jet engine 46 from choking. The expansion of nozzle throat 68 to either a fully open state or to the state that is sufficient to prevent the jet from choking will ensure that the exhaust plume exiting propulsion system 22 is subsonic and therefore will comply with known regulatory restrictions on noise. In addition, by expanding nozzle throat 68 to an expanded state that is fully open, or that is open to a state that is sufficient to avoid choking the flow, the ability of jet engine 46 to tolerate flow distortion is enhanced. Further, the expansion of nozzle throat 68 will reduce the back pressure on the system and the fan working line, providing additional margin to fan load limits and reducing the exit velocity of the flow resulting in lower aircraft takeoff noise.

To assess whether to expand nozzle throat 68 to an open state that is either fully open or that is open to a state that is sufficient to avoid choking, controller 52 is configured to obtain information from the weight-on-wheel sensor 76 indicative of whether aircraft 20 is on the ground or not.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

What is claimed is:

1. A propulsion system for use with an aircraft, the propulsion system comprising:
   an engine having a predetermined tolerance for flow distortion;
   an inlet disposed upstream of the engine, the inlet including a forward cowl lip and an aft cowl lip, the forward cowl lip disposed forward of the aft cowl lip, the forward cowl lip configured to move between a retracted position and a deployed position, the forward cowl lip being adjacent to the aft cowl lip in a sealed arrangement such that a freestream of air is precluded from passing between the forward cowl lip and the aft cowl lip when the forward cowl lip is in the retracted position, the forward cowl lip being spaced apart from the aft cowl lip when the forward cowl lip is in the deployed position, the forward cowl lip having a first radius of curvature, the aft cowl lip having a second radius of curvature, the first radius of curvature being less than, or equal to, the second radius of curvature; and a controller operatively coupled with the engine and with the inlet, the controller configured to impose a restriction on a maximum thrust commanded position of the engine when the aircraft is on a ground surface and moving below a predetermined speed, the controller further configured to lift the restriction when the aircraft is moving at at least the predetermined speed, and the controller still further configured to control the forward cowl lip to move between the retracted position and the deployed position based on a phase of flight of the aircraft, wherein the controller is further configured to control the inlet to retract the forward cowl lip to the retracted position when the aircraft takes off of the ground surface.

2. The propulsion system of claim 1, the aircraft having a weight-on-wheels sensor, wherein the controller is configured to be communicatively coupled with the weight-on-wheels sensor and to obtain information from the weight-on-wheels sensor indicative of when the aircraft is on the ground and when the aircraft is off the ground, and wherein the controller is further configured to control the inlet to move the forward lip to the retracted position when the controller obtains information from the weight-on-wheels sensor indicating that the aircraft is off of the ground and wherein the controller is still further configured to control the inlet to move the forward cowl lip to the deployed position when the controller receives information from the weight-on-wheels sensor indicating that the aircraft is on the ground.

3. The propulsion system of claim 1 wherein the inlet is configured as a pitot inlet.

4. The propulsion system of claim 1, wherein the inlet has a non-axi symmetric configuration.

5. The propulsion system of claim 1, wherein the inlet includes a movable strut coupling the forward cowl lip to the aft cowl lip, the strut configured to move between a forward position and an aft position with respect to the aft cowl lip, wherein the forward cowl lip is moved to the deployed position when the strut is moved to the forward position and wherein the forward cowl lip is moved to the retracted position when the strut is moved to the aft position.

6. The propulsion system of claim 5, further comprising a plurality of the struts.

7. The propulsion system of claim 1, wherein the controller is configured to lift the restriction when the aircraft is moving on the ground at a speed between static and a V1 decision speed.

8. The propulsion system of claim 1, wherein the restriction limits the maximum thrust commanded position of the engine as a function of speed to a level that corresponds with predetermined distortion indices at an aerodynamic interface plane of the engine when the forward cowl lip is in the deployed position.

9. The propulsion system of claim 1, wherein the restriction limits the maximum power of the engine to a level that corresponds with predetermined distortion indices at an aerodynamic interface plane when the forward cowl lip is in the deployed position.

10. The propulsion system of claim 1, wherein the restriction limits the maximum power of the engine to a level that corresponds with predetermined distortion indices at an aerodynamic interface plane when the forward cowl lip is in the deployed position that will yield a maximum amount of flow distortion that falls within the predetermined tolerance for flow distortion of the engine.

11. The propulsion system of claim 1, wherein a distance by which the forward cowl lip and the aft cowl lip are spaced apart when the forward cowl lip is in the deployed position is based on predetermined distortion indices at an aerodynamic interface plane.

12. The propulsion system of claim 1, wherein a magnitude of the second radius of curvature is based on an amount of flow separation at the inlet when the forward cowl lip is in the deployed position and when the restriction on the maximum thrust commanded position of the engine is imposed that will yield an amount of flow distortion that falls within predetermined distortion indices at an aerodynamic interface plane.

13. The propulsion system of claim 1, wherein a magnitude of the second radius of curvature is based on an amount of flow separation at the inlet when the forward cowl lip is in the deployed position and when the restriction on the maximum thrust commanded position of the engine is imposed that will yield a maximum amount of flow distortion that falls within the predetermined distortion indices at an aerodynamic interface plane.

14. The propulsion system of claim 1, wherein the predetermined speed is between brake release and a V1 decision speed.

15. The propulsion system of claim 1, the aircraft having a sensor configured to determine a speed of the aircraft while rolling on a ground surface, wherein the controller is configured to be communicatively coupled with the sensor and to obtain information from the sensor indicative of the speed of the aircraft on the ground.

16. A propulsion system for use with an aircraft, the propulsion system comprising:

an engine having a predetermined tolerance for flow distortion;

an inlet disposed upstream of the engine, the inlet including a forward cowl lip and an aft cowl lip, the forward cowl lip disposed forward of the aft cowl lip, the forward cowl lip configured to move between a retracted position and a deployed position, the forward cowl lip being adjacent to the aft cowl lip in a fluid tight arrangement such that a freestream of air is precluded from passing between the forward cowl lip and the aft cowl lip when the forward cowl lip is in the retracted position, the forward cowl lip being spaced apart from the aft cowl lip such that the freestream of air can flow between the forward cowl lip and the aft cowl lip when the forward cowl lip is in the deployed position, the forward cowl lip having a first radius of curvature, the aft cowl lip having a second radius of curvature, the first radius of curvature being less than or equal to the second radius of curvature;

a nozzle assembly disposed downstream of the engine, the nozzle assembly having a variable nozzle throat, the variable nozzle throat configured to expand and contract between a maximum open state and a minimum open state; and a controller operatively coupled with the engine, with the inlet, and with the nozzle assembly, the controller configured to impose a restriction on a maximum thrust commanded position of the engine when the aircraft is on a ground surface and moving below a predetermined speed, the controller further configured to lift the restriction when the aircraft is moving at at least the predetermined speed, the controller is further configured to control the inlet to extend the forward cowl lip to the deployed position when the aircraft is on the ground surface and wherein the controller is still further configured to control the nozzle assembly to expand the variable nozzle throat to an extent that will maintain a mass flow passing through the nozzle assembly below a choked condition when the aircraft is on the ground surface and the engine is delivering the maximum power and the forward cowl lip is extended to the deployed position.

17. The propulsion system of claim 16, wherein the controller is configured to control the nozzle assembly to expand the variable nozzle throat to the maximum open state when the aircraft is on the ground surface and the engine is delivering the maximum power and the forward cowl lip is extended to the deployed position.

18. The propulsion system of claim 17, wherein the controller is further configured to control the inlet to retract the forward cowl lip to the retracted position when the aircraft takes off of the ground surface.

* * * * *